Nov. 1, 1949     A. K. HINCHMAN     2,486,948
SOLENOID BIPOLAR MAGNETIC AIR VALVE ENGINE
Filed April 5, 1948     5 Sheets-Sheet 1
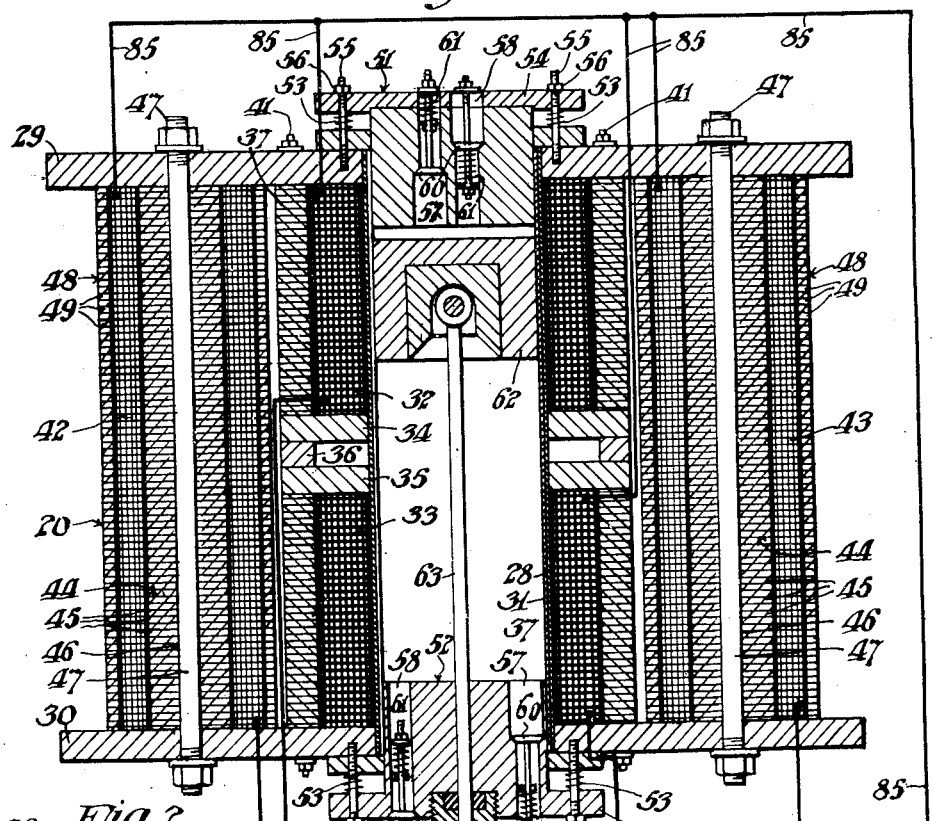
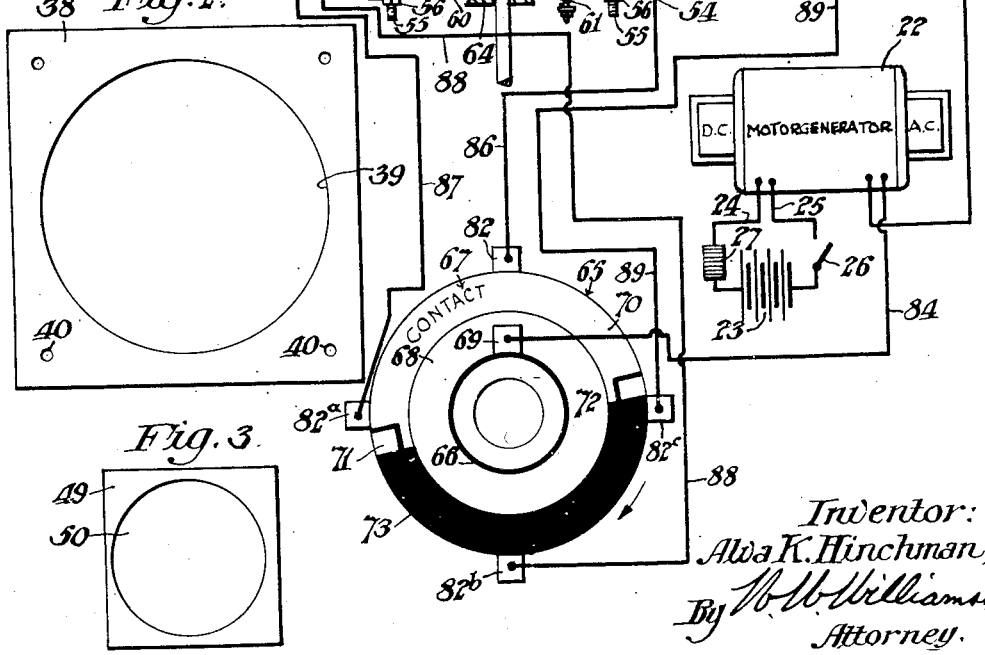
Inventor:
Alva K. Hinchman,
By W. W. Williamson
Attorney.

Inventor:
Alva K. Hinchman,
By W. W. Williamson
Attorney.

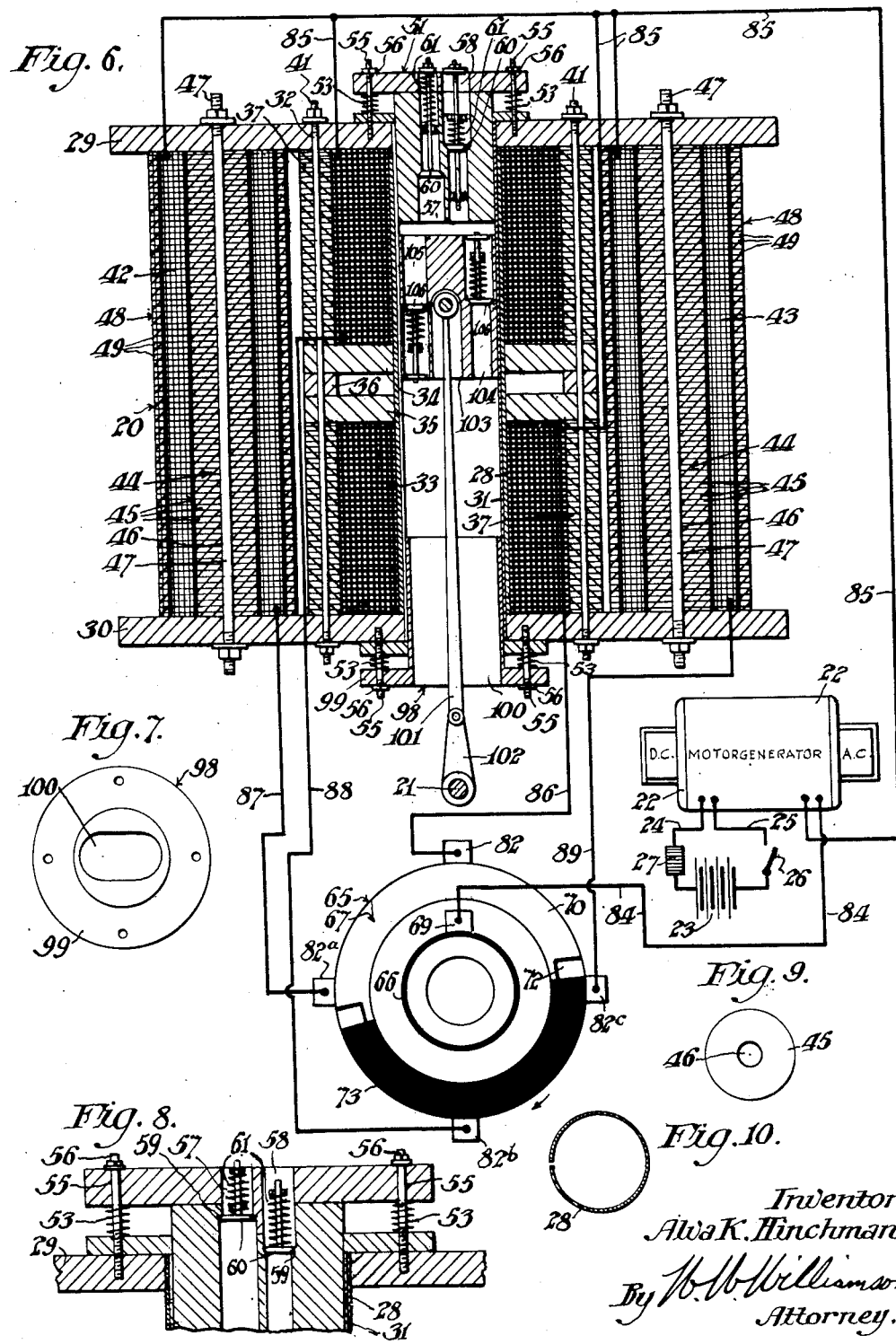

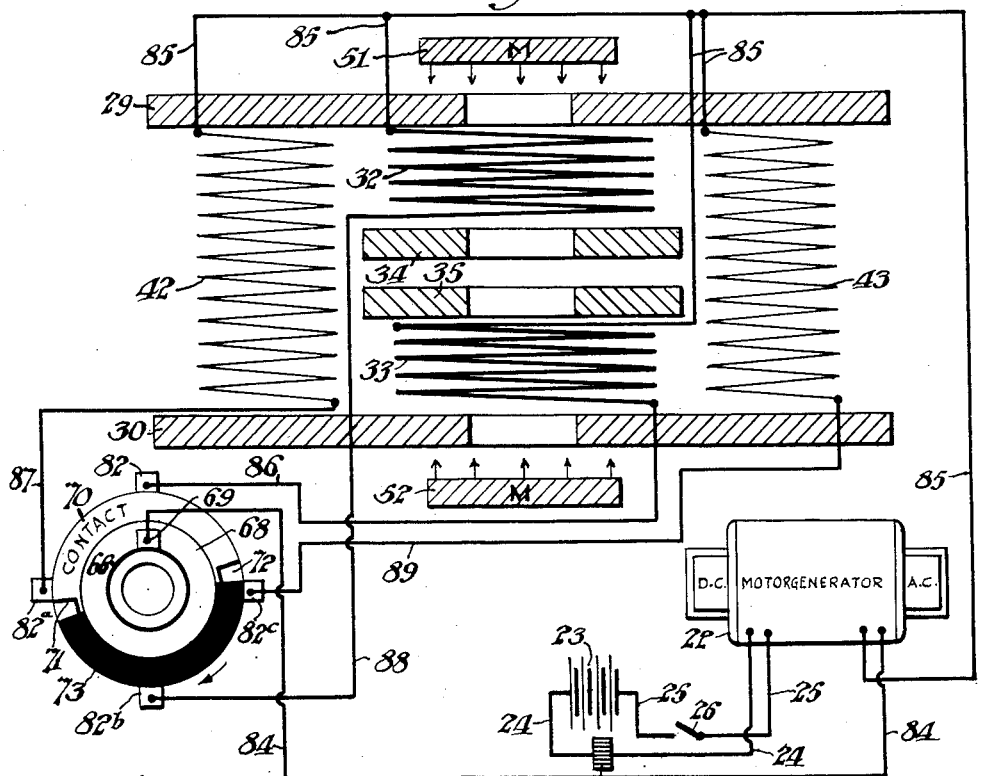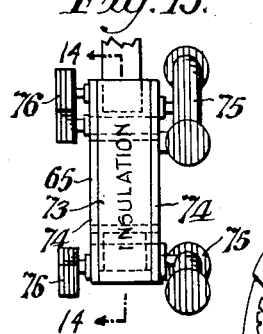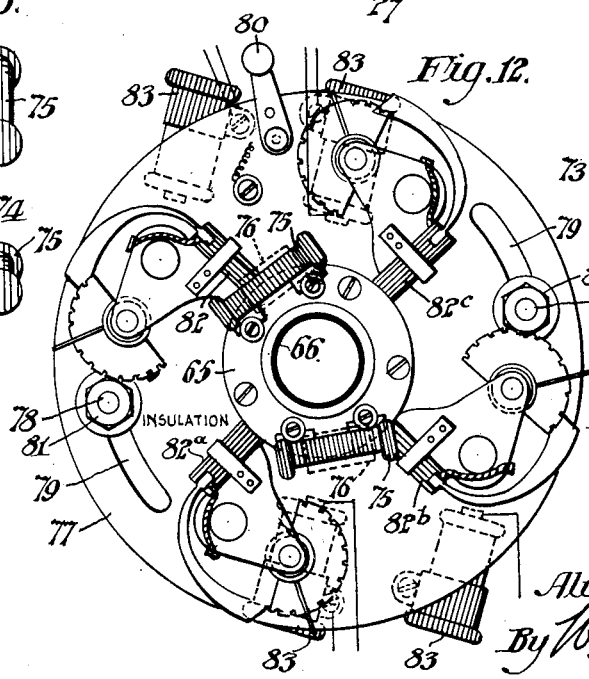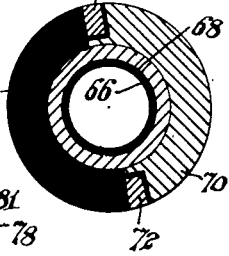

Nov. 1, 1949 — A. K. HINCHMAN — 2,486,948
SOLENOID BIPOLAR MAGNETIC AIR VALVE ENGINE
Filed April 5, 1948 — 5 Sheets-Sheet 5

LINES OF FORCE

Inventor:
Alva K. Hinchman,
By W. W. Williamson
Attorney.

Patented Nov. 1, 1949

2,486,948

UNITED STATES PATENT OFFICE 2,486,948

SOLENOID BIPOLAR MAGNETIC AIR VALVE ENGINE

Alva K. Hinchman, Bryn Mawr, Pa.

Application April 5, 1948, Serial No. 19,093

12 Claims. (Cl. 172—126)

My invention relates to a new and useful solenoid bi-polar magnetic air valve engine, and has for one of its objects to construct an engine including one or more magnetic pistons, each incased and reciprocatingly mounted in a non-magnetic tube surrounded by a strong inductance. Each piston is influenced by auxiliary magnetic valvular pistons at both ends of the casing and projecting thereinto. Each auxiliary piston has a slight reciprocating movement controlled by springs and said auxiliary piston has air passageways therethrough controlled by air inlet and outlet valves. A primary piston has one north pole at one end and one south pole at the opposite end and the auxiliary valvular pistons are of a polarity opposed to that of the adjacent ends of the primary piston whereby as said primary piston approaches an auxiliary piston the two will be attracted towards one another to augment the power of the primary piston. The compression and expansion of the air passing into and out of the space between the primary and auxiliary pistons cools the parts, produces a cushion effect for the primary piston and assists in increasing the engine power.

Another object of the present invention is to eliminate the air inlet and outlet controlling valves from one of the auxiliary pistons set forth above and provide an unobstructed but restricted passageway therethrough, the flow of air between said passageway and the chamber on that side of the piston opposite the valve having the unobstructed passageway, being regulated by valve controlled passageways through the piston.

Another object of this invention is to provide a magnetic air valve engine operable by either direct or alternating electric current and in either single or double effect according to the arrangement of the coils.

A further object of the invention is to provide a cylinder unit of the double effect type including two primary coils arranged in endwise alignment and through which the piston operates, and two pairs of secondary coils located in parallel positions at opposite sides of the primary coils but with the coils of each pair in endwise alignment.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which—

Fig. 1 is a vertical sectional view of one cylinder of my improved engine, the electrical circuits being illustrated diagrammatically.

Fig. 2 is a face view of a plate of the laminated housing or jacket of a primary coil.

Fig. 3 is a similar view of a plate of the laminated housing or jacket of a secondary coil.

Fig. 6 is a vertical sectional view of a cylinder of a further modified form of the engine and the electrical circuits shown diagrammatically.

Fig. 7 is an inner end view of the lower magnetic valve.

Fig. 8 is an enlarged fragmentary detailed vertical sectional view of the upper magnetic valvular secondary piston.

Fig. 9 is a face view of one of the discs of the laminated core of a secondary coil.

Fig. 10 is a cross sectional view of the non-magnetic split tube forming the wall surrounding the piston.

Fig. 11 is a schematic diagram of the circuits in a single effect type of solenoid bi-polar magnetic air valve engine.

Fig. 12 is an enlarged face view of the distributor.

Fig. 13 is an edge view of the rotor removed from the distributor.

Fig. 14 is a section on the line 14—14 of Fig. 13 of the rotor body.

Figure 4:
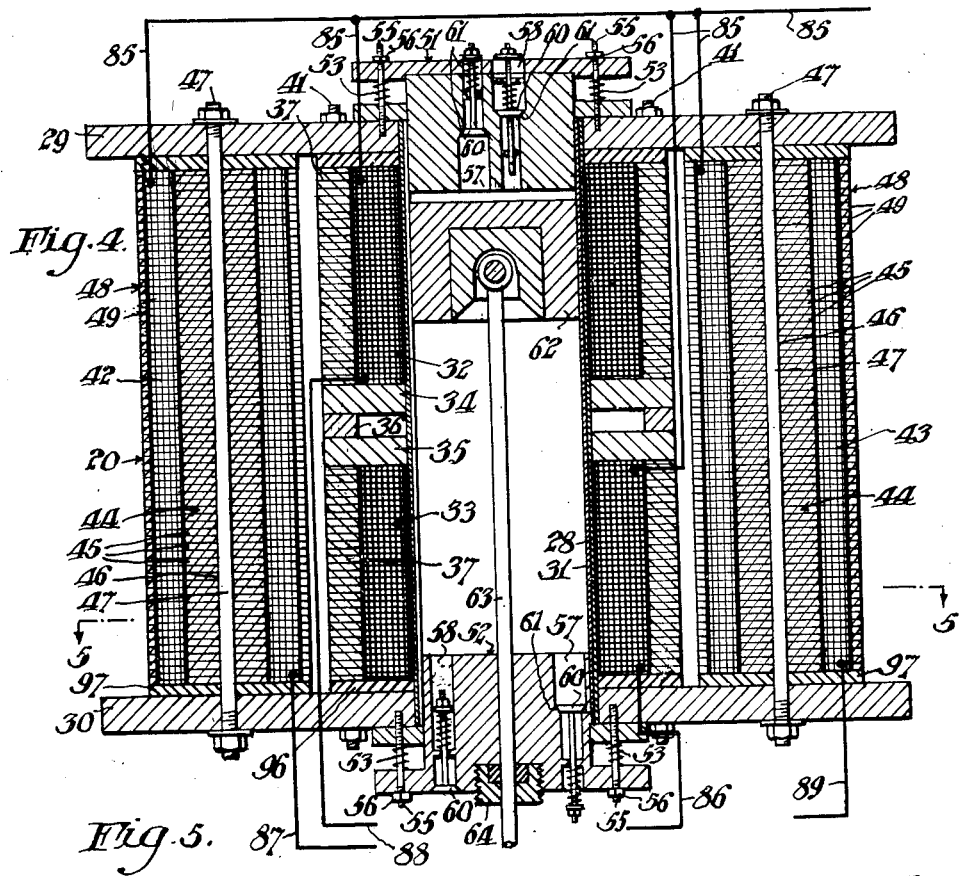
Fig. 4 is a vertical sectional view of a modified construction and showing only parts of the electrical connections in diagram.

In carrying out my invention as herein embodied the solenoid bi-polar magnetic air valve engine includes one or more cylinder units 20, suitably mounted on a support, such as a crank case or frame, having bearings for the crank shaft 21, one of which is depicted in Fig. 6, may operate the motor-generator 22. A source of electric current, such as a battery 23, or other direct current source, is connected by wires 24 and 25 to the D. C. compound side of said motor-generator, and the A. C. side of motor-generator are connected to the engine coils. In the battery circuit may be located a switch 26 and a circuit breaker or relay 27.

Each cylinder unit 20, includes a longitudinally split non-magnetic tube 28 of brass or bronze running the full length of a cylinder and extending through the upper and lower heads or end plates 29 and 30 respectively, and said tube 28 is preferably surrounded by a fibre tube 31.

Wound around or surrounding the upper or outer end portion of the non-magnetic tube 28 is the upper or top primary coil 32 preferably with left hand windings and a lower or bottom primary coil 33 is wound around or surrounds the lower or inner end portion of said non-magnetic tube 28 preferably with right hand windings. The adjacent ends of said primary coils 32 and 33 are separated to split the magnetic flux between them. At said adjacent ends of the primary coils, which are the inner ends of said coils relative to the cylinder unit only, are located pole plates 34 and 35 for the upper and lower primary coils, respectively, and these plates are held in separated positions by suitable non-magnetic spacers 36. Each plate 34 is of north polarity and each plate 35 is of south polarity.

Surrounding each primary coil 32, 33 is a laminated housing or jacket 37 made up of a multiplicity of very thin silicon metal plates 38, Fig. 2, coated with shellac or having other suitable insulating material between them. The housing plates 38 are preferably square with large round holes 39 for accommodation of the coil and small holes 40 in the corners to receive brass or nonmagnetic rods 41 projected through the end plates 29 and 30, the pole plates 34 and 35 of the primary coils, the spacers 36 and the housings 37.

Washers and nuts are mounted on the protruding ends of the rods 41 to secure the parts together.

On diametrically opposite sides of the primary coils, between the upper and lower end plates 29, 30, are mounted the secondary coils 42 and 43. Each secondary coil is wound on a laminated core 44 comprising a multiplicity of very thin discs of silicon steel 45, Fig. 9, having a central hole 46 for the reception of a steel rod 47 passing through the cores and the upper and lower end plates 29 and 30. Washers and nuts are mounted on the protruding ends of said rods to hold the secondary coils in place.

Surrounding each secondary coil 42, 43 is a laminated housing or jacket 48 made up of a multiplicity of very thin metal silicon plates 49, Fig. 3, coated with shellac or otherwise separated. The plates of the secondary coil housings are also square and each has a hole 50 to accommodate a coil. The housings of the secondary coils are spaced laterally from the housings of the primary coils.

Referring to the structure in Fig. 1, and the diagram of Fig. 11, in the outer and inner ends of the tube 28 which forms the cylinder bore for the primary piston, to be later described, are mounted the valvular secondary pistons 51 and 52, respectively, which have a limited longitudinal movement, being urged outwardly towards a neutral position by the springs 53 engaging caps 54 carried by said valvular secondary pistons and surrounding the studs 55 on which nuts 56 are mounted for adjusting the tension of said springs.

In each of the valvular secondary pistons is formed a longitudinal intake opening 57 and an outlet opening 58. All of the inlet and outlet openings have valve seats 59, Fig. 8, associated with them on which seat valves 60, the latter being urged towards their respective seats by springs 61 located between relative stationary parts of the secondary pistons and component parts of the valves. The tension of the springs may be regulated by nuts on the valve stems or extensions thereof.

Within the non-magnetic tube 28 or bore of the cylinder and between the outer and inner magnetic valvular secondary pistons is reciprocatingly mounted a piston 62 of desirable construction and material. A connecting rod 63 is suitably attached to said piston and to the crank shaft, not shown, and said connecting rod projects through the inner or lower secondary piston 52 and sealed by a packing 64. Associated with the crank shaft is located a timer or distributor, Fig. 12, which includes a rotor 65 that revolves with the crank shaft and therefore is fixed to it with an insulating sleeve 66 between them, Fig. 12.

The rotor 65 comprises, principally, the timer 67 and the collector ring 68, the latter having a collector brush 69 cooperating therewith, which brush is electrically connected by a conductor with one side of the secondary of the motor-generator 22, more fully set forth below. The timer 67 comprises a major electrical conductive contact segment 70 and two minor electrical conductive contact segments 71 and 72 as well as a large insulated segment 73. The major contact segment is in electrical conductive engagement with the collector ring 68. The minor contact segments 71 and 72 are insulated from the major contact segment and from the collector ring 68 or other adjacent metal elements. The several contact segments and insulation material are held between retainer rings 74, Fig. 13, which are in electrical engagement with the contact segments.

One end of a resistor 75 is electrically connected to each minor contact segment and the other end is grounded on a retainer ring 74 so as to be electrically connected with the major contact segment 70. Also one end of a make-and-break condenser 76 is connected with each minor contact segment and the other end is grounded on a retainer ring 74.

The stator 77, Fig. 12, of each distributor is a plate or disc of insulation material and is supported by any suitable means 78 within a housing and portions of said supporting means 78 project through arcuate slots 79 to permit rotation of the stator about the rotor which it surrounds for advancing and retarding the speed of the engine. The stator may have a handle 80 for operating it and said stator may be retained in any adjustment by nuts 81 on the supporting means or in some other suitable manner.

Each stator has a number of brush holders in which the main brushes 82, 82a, 82b, and 82c are mounted. Each main brush is electrically connected in any appropriate manner with the several coils as will be later described.

Now taking up the complete circuits of a single cylinder, reference will first be made to Figs. 1 and 11, in particular, wherein the collector brush 69 of a distributor is shown as electrically connected through a conductor 84 with one pole of the secondary of the motor-generator 22. The other pole of said secondary of the motor-generator is electrically connected through a conductor 85 and its branches with one end of each of the primary and secondary coils.

The main brush 82 is connected by a conductor 86 with one of the primary coils, for example the lower primary coil 33; the main brush 82a is connected by a conductor 87 with one of the secondary coils, as 42; the main brush 82b is connected by a conductor 88 with the other or upper primary coil 32; and the main brush 82c is connected by a conductor 89 with the other secondary coil, as 43.

Figure 15:
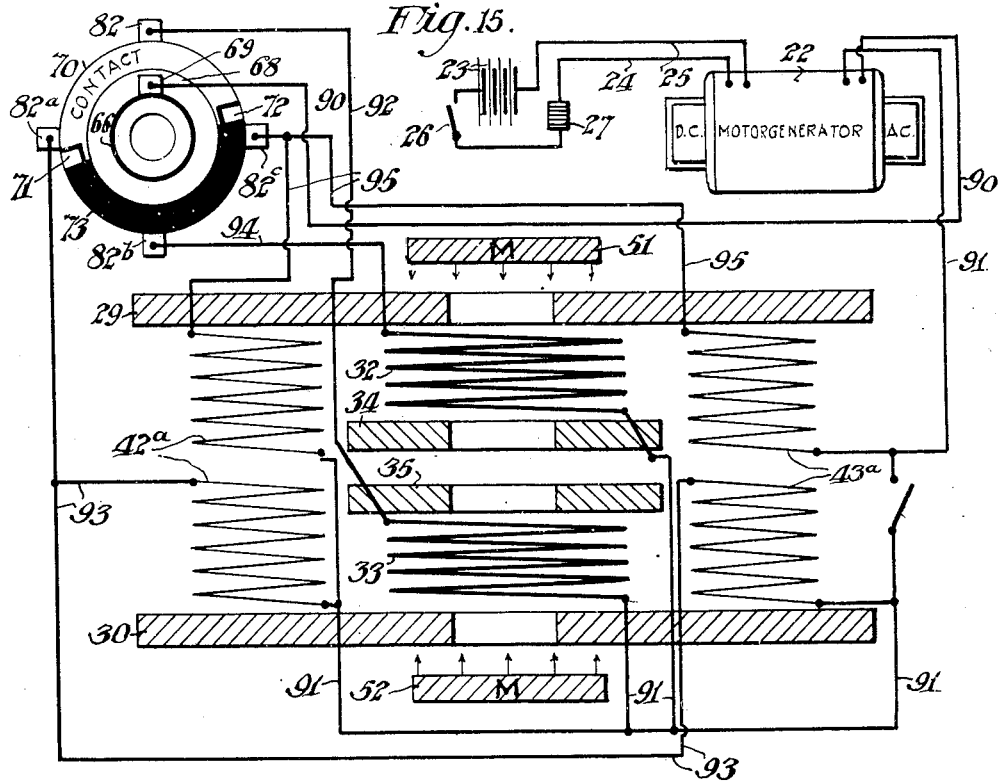
Fig. 15 is a schematic diagram of the circuits in a double effect type of solenoid bi-polar magnetic air valve engine.

Referring now to Fig. 15, illustrating, diagrammatically, the arrangement of the coils in the double effect type of apparatus everything, except the secondary coils and some of the electrical circuits, are the same as above described and where the parts are the same the same references will be applied. In this double effect type of device the primary coils, in particular, are identical with those previously mentioned and the reference characters are used. There are two pairs of secondary coils 42a and 43a and each individual secondary coil is wound on its own or a separate laminated core and enclosed in a separate laminated housing or jacket like the primary coils, although each pair can be wound on a single core and enclosed in a single housing or jacket. The coils of a pair are in spaced endwise alignment and where they are individual units this spacing provides an air gap or split magnet flux.

In the double effect type of apparatus, the collector brush 69 of a distributor is electrically connected through a conductor 90 with one terminal of the secondary of the motor-generator 22. The other pole of said secondary is electrically connected through a conductor 91 and its branches with one end of each of the primary and the individual secondary coils.

One of the brushes, as 82, is connected by a conductor 92, with one of the primary coils, as the lower primary coil 33; another main brush, as 82a, is connected by a conductor 93 with one, as the lower, coil of each pair of secondary coils; the main brush 82b is connected by a conductor 94, with the upper or other primary coil 32; and the main brush 82c is connected by a conductor 95 with the other or upper coil of each of the secondary coils.

Figure 5:
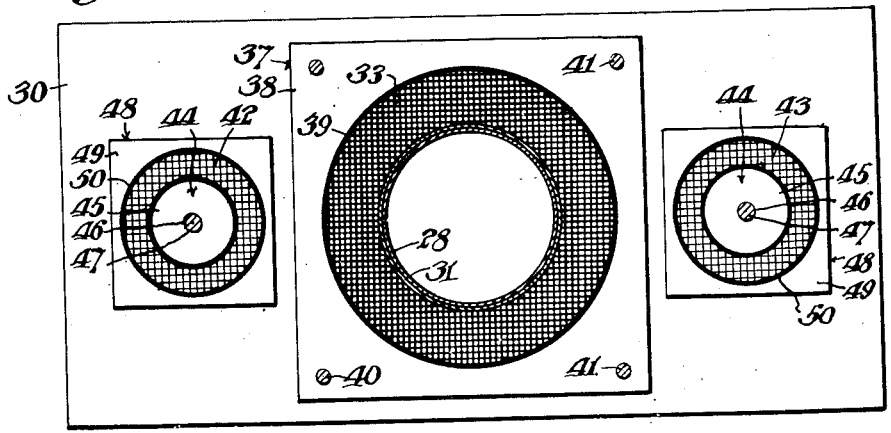
Fig. 5 is a cross sectional view thereof on the line 5—5 of Fig. 4.

Referring particularly to Figs. 4 and 5, the structure disclosed is similar in all respects to that illustrated in Fig. 1 with the addition of coil terminal plates 96 at the outer ends of the primary coils 32, 33 and similar coil terminal plates 97 at both ends of both secondary coils 42, 43. These coil terminal plates are secured to their respective coils and provide unitary coil structures that may be readily assembled between the end plates or heads 29, 30.

A complete structure similar to that depicted in Fig. 1 is disclosed in Fig. 6 wherein the valvular secondary piston at the inner end of the primary coil structure or cylinder is eliminated and in its place is substituted a valveless secondary magnetic piston 98, Figs. 6 and 7, which has a cap 99. The valveless secondary piston 98 and its cap has a hole 100 running completely through them, from end to end, which is of general elliptical or oblong shape in cross section so that a connecting rod 101 having a swinging motion in the cylinder can operate unobstructed.

One end of the piston rod is connected to a crank 102 and the other end to the piston 103 which, in this type of the invention, has an inlet passageway 104 and outlet passageway 105 through it from end to end. These passageways are controlled by spring operated valves 106 assembled in proper relation to the direction of air flow. In all other respects the structure is identical with that illustrated in Fig. 1.

Under some conditions the actual valves in the primary and secondary magnetic pistons leaving only an opening or openings for the ingress and egress of air although the valves function regulate the actual flow of air whereby its composition and functional characteristics can be utilized to the fullest extent.

In actual tests it has been discovered that a slight compression of the air during short periods increases the effectiveness of the engine in conjunction with the magnetic forces generated in the coils and acting upon the primary and secondary pistons.

Figure 16:
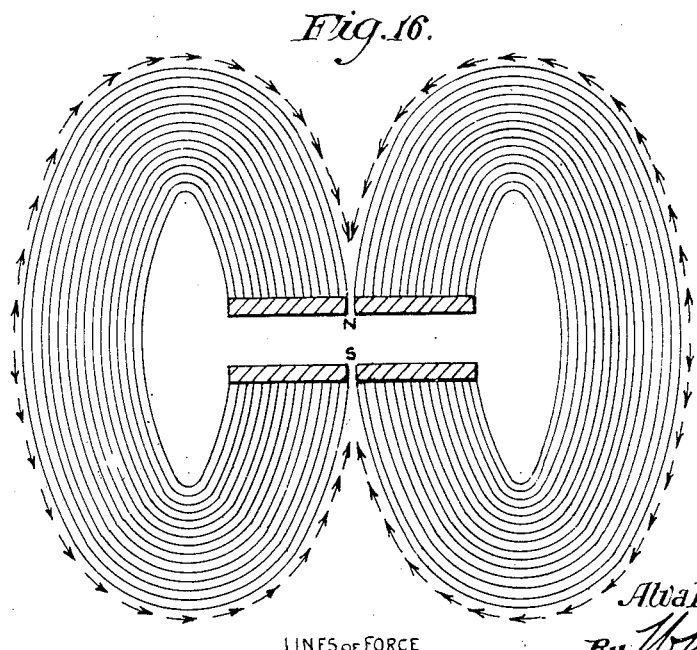
Fig. 16 is a diagram of the field of force or power flux created by the coils and showing the paths of the magnetic lines of force.

In operation, the current from the battery or other source of electricity is turned on to operate the D. C. side of the motor-generator in order to supply current to the several coils, both primary and secondary. When the pistons are being reciprocated and the distributors actuated assuming the primary piston to be at the lower end of its stroke, then as the contact portion of the timer disc 65, engages the brush 82c the right hand secondary coil 43 will be energized or excited and while being retained in this condition the contact portion of the timer disc 65 engages the brush 82b thereby placing the upper or top primary coil 32 in the circuit so as to energize or excite said primary coil and thus compounding the magnetic forces of said coils. The next step energizes or excites the left hand secondary coil 42 and the lower primary coil 33, in sequence, so as to compound the magnetic forces thereof. The excitation of the coils in the manner and order set forth results in a magnetic power flux depicted in Fig. 16 which is a very powerful working force.

The energizing of the secondary coil 43 and the primary coil 32 will move the primary piston 62 upward or outward and the circuits of said coils are broken just prior to said primary piston reaching the end of its up stroke. As the piston approaches the top magnetic secondary piston 51 the latter moves inward and eliminates outside magnetic flux or collects them to be combined with the main magnetic flux.

Upon completion of the up stroke of the piston, the other secondary and primary coils are energized and act on the primary piston to move the latter downward or inward. The suction action produced in the cylinder by the downward movement of the primary piston opens the air intake passageway 57 in the upper secondary piston 51 to relieve any "back pull" on said primary piston, and at the same time opens the air outlet passageway 58 in the lower secondary piston 52 to prevent undue air compression. As the piston approaches the bottom secondary piston 52 the latter moves inward and, like the upper one creates a strong magnetic pull, just before the completion of the downward stroke of the primary piston.

In that type of device shown in Fig. 4, the air passageways permit the apparatus to function in the manner above outlined in connection with the structure illustrated in Fig. 1. In the form of engine depicted in Fig. 6 a similar action takes place but the air passageways in the primary piston are substituted for identical ones disclosed in the lower secondary pistons in the previously described forms of the engine.

While I have described the invention as though composed of a single cylinder, it will be obvious that any number of cylinder units can be utilized as each will be a duplicate of the one set forth.

Of course I do not wish to be limited to the exact details of construction herein shown and described as these may be varied within the scope of th appended claims without departing from the spirit of my invention.

Having described my invention, what I claim as new and useful is:

1. A solenoid bi-polar magnetic engine comprising a pair of primary coils in endwise alignment and surrounding a hollow non-magnetic tube, a pole plate at the inner end of each coil of the pair, a laminated housing enclosing each of said coils, two secondary coils on opposite sides of the pair of primary coils, a laminated core in each secondary coil, a laminated housing embracing each secondary coil, end plates extending across the outer ends of all coils in the same planes, means to excite said coils in proper timing order, and a primary piston reciprocatingly mounted in the tube.

2. The engine of claim 1, in combination with a magnetic secondary piston at each end of the non-magnetic tube.

3. An engine of the kind described comprising, in combination, two spaced end plates, a longitudinally split non-magnetic tube projected across the space between said end plates and through the latter, a primary coil embracing each end of said split tube and having their adjacent ends spaced apart to form an air gap, a laminated housing embracing each primary coil, a secondary coil located at each of two diametrically opposite sides of the primary coils and extending the entire distance between said end plates, laminated cores in said secondary coils, laminated housings embracing said secondary coils and spaced from the housings of the primary coils, a motor-generator electrically connected with the several coils for energizing them, a timer in the circuits for making and breaking said circuits in proper timing order, a source of electricity for actuating said motor-generator, a primary piston in the split tube, and a magnetic secondary piston in both ends of the split tube.

4. The engine of claim 3 wherein the secondary pistons have valve controlled inlet and outlet passageways.

5. The engine of claim 3 wherein the primary piston and one secondary piston have valve controlled inlet and outlet passageways.

6. A magnetic engine comprising two spaced end plates, a split non-magnetic metal tube extending across the space between said end plates and projected through the latter, a fibre tube surrounding the non-magnetic metal tube, a primary coil surrounding each end portion of the fibre tube and in spaced endwise alignment, a pole plate extending across the inner end of each primary coil, spacers of non-magnetic material between the pole plates, a laminated housing embracing each primary coil, non-magnetic fastening devices passing through the end plates, the pole plates, the spacers and the housings to fasten the parts together, a secondary coil located at each of two diametrically opposite sides of the pair of primary coils and extending the entire distance between said end plates, a laminated housing embracing each secondary coil, a laminated core in each secondary coil, non-magnetic fastening devices passing through the end plates and the cores to hold the secondary coils in place, a magnetic secondary piston at each end of the non-magnetic tube, a primary piston reciprocatingly mounted in said non-magnetic tube between the secondary pistons, and means to energize the coils in predetermined order.

7. The engine of claim 6 wherein the means to energize the coils in predetermined order consists of a motor-generator, a battery connected to the primary of the D. C. side of said motor-generator, a circuit breaker or relay in the battery circuit, a timer, a conductor connecting the collector brush of the timer with a pole of the secondary of the A. C. side of said motor-generator, a conductor leading from the other pole of said secondary of the A. C. side of said motor-generator to an end of each of the coils, and a conductor leading from each distributor brush of the timer to a separate coil.

8. A magnetic engine comprising two spaced end plates, a longitudinally split non-magnetic metal tube extending across the space between said end plates and projected through the latter, a fibre tube surrounding said non-magnetic tube, a primary coil surrounding each end portion of the fibre tube and in spaced endwise alignment, a pole plate extending across the inner end of each primary coil, spacers of non-magnetic material between the pole plates, a laminated housing embracing each primary coil, non-magnetic fastening devices passing through the end plates, the pole plates, the spacers and the housings to fasten the parts together, a secondary coil located at each of two diametrically opposite sides of the pair of primary coils, a laminated housing embracing each secondary coil, a laminated core in each secondary coil, non-magnetic fastening devices passing through the end plates and cores to hold said secondary coils in place, an apertured secondary piston in each end of the non-magnetic tube, a primary piston reciprocatingly mounted in said non-magnetic tube between the secondary pistons, and means to energize the primary coils and the secondary coils in predetermined order.

9. The engine of claim 8 wherein the means to energize the coils in predetermined order consists of a motor-generator, a battery connected to the primary of the D. C. side of said motor-generator, a circuit breaker or relay in the battery circuit, a timer, a conductor connecting the collector brush of the timer with a pole of the secondary of the A. C. side of said motor-generator, a conductor leading from the other pole of said secondary of the A. C. side of said motor-generator to an end of each coil, a conductor leading from each of two distributor brushes that are 180 degrees apart to a separate coil, and a conductor leading from each of the other two distributor brushes that are also 180 degrees apart to a respective one of the secondary coils.

10. A solenoid bi-polar magnetic engine comprising a tubular non-magnetic central element, a pair of primary coils surrounding said element and in endwise spaced relation, secondary coils located at two diametrically opposite sides of and extending the full length of the pair of primary coils combined, a primary piston reciprocatingly mounted within the central element intermediate the ends thereof, valvular secondary pistons mounted in the ends of said central element and having limited reciprocating movements and normally urged outwardly by spring means, and means to energize the coils.

11. A solenoid bi-polar magnetic engine comprising a tubular non-magnetic central element, a pair of primary coils surrounding said element and in endwise relation, secondary coils located at two diametrically opposite sides of and extending the full length of the pair of primary coils combined, a valvular primary piston reciprocatingly mounted within the central element intermediate the ends thereof, a valvular secondary piston mounted in the upper end of said central element, another secondary piston mounted in the lower end of the central element and having an opening therethrough for the passage of a connecting rod attached to the primary piston, said secondary pistons having limited reciprocating movements and normally urged outwardly by spring means, and means to energize the several coils in predetermined order.

12. A magnetic engine comprising a pair of primary coils in endwise alignment, a split nonmagnetic tube extending through the centers of both primary coils, a magnetic piston in said tube, two pairs of secondary coils, the coils of each pair being in endwise alignment, a pair of secondary coils that are in endwise alignment being located at each of two diametrically opposite sides of the pair of primary coils, means to energize all of said coils in a predetermined order of time, a laminated housing embracing each of the coils, and a laminated core in each of the secondary coils.

ALVA K. HINCHMAN.

REFERENCES CITED

The following references are of record in the file of this patent:

UNITED STATES PATENTS

| Number | Name | Date |
| --- | --- | --- |
| 568,947 | Hicks | Oct. 6, 1896 |
| 1,291,819 | Fogel et al. | Jan. 21, 1919 |
| 2,296,554 | Hinchman | Sept. 22, 1942 |